US012803894B2

(12) United States Patent
Oliviero

(10) Patent No.: US 12,803,894 B2
(45) Date of Patent: Nov. 17, 2026

(54) SYSTEM FOR SUPPORTING IN-FIELD TESTING OF LINKS OF A COMMUNICATION NETWORK

(71) Applicant: Fibercop S.P.A., Milan (IT)

(72) Inventor: Diego Oliviero, Turin (IT)

(73) Assignee: FIBERCOP S.P.A., Milan (IT)

( * ) Notice: Subject to any disclaimer, the term of this patent is extended or adjusted under 35 U.S.C. 154(b) by 0 days.

(21) Appl. No.: 19/127,748

(22) PCT Filed: Nov. 6, 2023

(86) PCT No.: PCT/EP2023/080866

§ 371 (c)(1),
(2) Date: May 7, 2025

(87) PCT Pub. No.: WO2024/099982

PCT Pub. Date: May 16, 2024

(65) Prior Publication Data

US 2026/0180888 A1 Jun. 25, 2026

(30) Foreign Application Priority Data

Nov. 8, 2022 (IT) ........................ 102022000023043

(51) Int. Cl.
*H04L 43/50* (2022.01)

(52) U.S. Cl.
CPC .................................... *H04L 43/50* (2013.01)

(58) Field of Classification Search
CPC ... H04L 43/50; H04M 2203/051; H04M 3/30; H04B 3/46
See application file for complete search history.

(56) References Cited

U.S. PATENT DOCUMENTS 4,943,993 A 7/1990 Fore
2022/0034750 A1* 2/2022 Myslinski .......... G01M 11/0214

FOREIGN PATENT DOCUMENTS

GB 2452506 A 3/2009

OTHER PUBLICATIONS

International Search Report and Written Opinion mailed on Dec. 11, 2023, received for PCT Application No. PCT/EP2023/080866, filed on Nov. 6, 2023, 8 pages.

* cited by examiner

*Primary Examiner* — David S Huang
(74) *Attorney, Agent, or Firm* — XSENSUS LLP

(57) ABSTRACT

It is disclosed a system for supporting in-field testing of parallel links of a communication network, which are alternatively connectable to a further link of the network. The system comprises a first portable device comprising an input port manually connectable to the further link, output ports manually connectable to respective parallel links to be tested, and a number of switches. Each switch is operable between a closed status, in which it provides signal continuity between input port and a respective output port, and an open status in which it isolates the input port from the respective output port. The system also comprises a second portable device capable of transmitting a command to the first portable device via a bidirectional radio channel, the command inducing the first portable device to bring one of switches in the closed status. A method for in-field testing is also disclosed.

10 Claims, 3 Drawing Sheets

SYSTEM FOR SUPPORTING IN-FIELD TESTING OF LINKS OF A COMMUNICATION NETWORK

CROSS-REFERENCE TO RELATED APPLICATIONS

This application is a national stage application, filed under 35 U.S.C. § 371, of International Patent Application No. PCT/EP2023/080866, filed Nov. 6, 2023, which claims priority from Italian Patent Application No. 102022000023043, filed Nov. 8, 2022, the entire contents of each are incorporated herein by reference.

TECHNICAL FIELD

The present invention relates to the field of communication networks. In particular, the present invention relates to a system for supporting in-field testing of links of a communication network, for example (but not exclusively) secondary links between a cabinet and a distribution box of an access network.

BACKGROUND ART

As known, an access network comprises a plurality of wires, cables and equipment connecting a plurality of end users to a local exchange comprising banks of automated switching equipment which direct a call or connection to the end users.

More specifically, with reference to FIG. 1, a known access network 100 comprises one or more cabinets, each cabinet being connected to the local exchange (indicated by reference numeral 200) by means of a respective plurality of parallel links, also termed "primary links". By way of non-limiting example, in FIG. 1 two cabinets 301, 302 are shown, each connected to the local exchange 200 by means of a respective plurality of primary links 401, 402. Each plurality of primary links 401, 402 typically comprises a few hundreds of parallel links (e.g. 400 links), where each primary link may comprise e.g. a twisted pair or an optical fibre.

A known access network also comprises a plurality of distribution boxes, each distribution box being connected to one of the cabinets by means of a respective plurality of parallel links, also termed "secondary links". By way of non-limiting example, in FIG. 1 four distribution boxes 501, 502, 503, 504 are shown, the distribution boxes 501, 502 being connected to the cabinet 301 by means of respective pluralities of secondary links 601, 602 and the distribution boxes 503, 504 being connected to the cabinet 302 by means of respective pluralities of secondary links 603, 604. Each plurality of secondary links 601, 602, 603, 604 typically comprises 10 or more parallel links, depending on the number of end users to be connected to the distribution box (for example, in a building up to 100 parallel secondary links may be found). Each secondary link may comprise e.g. a twisted pair or an optical fibre.

A known access network also comprises, for each distribution box, one or more links (also termed "user links") connecting the distribution box to one or more end user devices. By way of non-limiting example, in FIG. 1 a single user link 701, 702, 703, 704 per distribution box 501, 502, 503, 504 is depicted, which connects the distribution box 501, 502, 503, 504 to an end user device 801, 802, 803, 804. Each user link may comprise e.g. a twisted pair or an optical fibre.

Currently, access networks may support different access technologies, such as PSTN (Public Switched Telephone Network), ISDN (Integrated Services Digital Network) and DSL (Digital Subscriber Line), including ADSL (Asymmetric DSL) and VDSL (Very-high-bit-rate DSL).

Primary links and secondary links are reciprocally connected at cabinets by means of suitable connectors and interfaces (e.g. RJ-11 connectors and RJ-45 interfaces, in case of twisted pairs), which may be manually disconnected and reconnected as needed. Typically, only some of the parallel secondary links between a cabinet and a distribution box are used, so that one or more secondary links are available for future use, such as the replacement of another deteriorated or broken secondary link.

For example, if an end user reports a problem with his connection (e.g. the connection is too slow or interrupted), a typical intervention provides that a service person tries to replace the presumably deteriorated or broken secondary link by which the end user (namely, his user link) is connected to the cabinet with one of the unused secondary links parallel thereto.

This kind of intervention requires that the service person subjects the available secondary links to a number of tests, in order to find a secondary link which can replace the deteriorated or broken one. The available secondary links shall be tested one by one, which requires that the service person travels back and forth several times between distribution box and cabinet, to manually connect both ends of each secondary link to be tested. This may be inconvenient, especially in rural areas where the distribution box (which is typically located close to the user's premises) and the cabinet may be some kilometres away from each other. Alternatively, two service people are needed, one at the distribution box and the other one at the cabinet. This however raises the costs of the intervention.

U.S. Pat. No. 4,943,993 discloses a system for conducting tests on cable pairs connectable to telephones. The system comprises a cable pair tester and a repair touch tone telephone connected to the cable pair tester via a cable pair. The cable pair tester is selectively connectable to a number of cable pairs to be tested. Upon reception of commands from the repair touch tone telephone, the cable pair tester connects to one of the cable pairs to be tested and places test conditions on that cable pair.

SUMMARY OF THE INVENTION

While the system of U.S. Pat. No. 4,943,993 allows to avoid that the service person travels back and forth several times between the locations where the opposite ends of the cable pairs to be tested are placed, the Applicant has noticed that this known system exhibits some drawbacks.

First of all, the system of U.S. Pat. No. 4,943,993 requires that a cable pair is dedicated to the connection between cable pair tester and repair touch tone telephone. If few cable pairs are available for the replacement of the deteriorated or broken one, dedicating a cable pair to the connection between cable pair tester and repair touch tone telephone significantly reduces the number of cable pairs to be tested, and then the probability to find a cable pair that can restore the end user's connectivity. Moreover, there is a chance that a cable pair selected as a connection between cable pair tester and repair touch tone telephone is itself deteriorated or broken, and so there is a risk that the system of U.S. Pat. No. 4,943,993 would not properly operate.

Furthermore, the cable pair tester of U.S. Pat. No. 4,943,993 is conceived to be permanently installed at main frames to test several cable pairs, and is therefore complex and bulky. The cable pair tester is therefore not suitable for being provided as part of the equipment to service people in charge of performing in-field interventions, neither for being accommodated in the narrow space which is typically available at the cabinets of an access network.

In view of the above, the Applicant has tackled the problem of providing a system for supporting in-field testing of a plurality of parallel links of a communication network (for example, but not exclusively, a plurality of parallel secondary links of an access network) alternatively connectable to a further link of the communication network (for example, but not exclusively, a primary link of an access network) which overcomes the aforesaid drawbacks.

In particular, the Applicant has tackled the problem of providing a system for supporting in-field testing of a plurality of parallel links of a communication network (for example, but not exclusively, a plurality of parallel secondary links of an access network) alternatively connectable to a further link of the communication network (for example, but not exclusively, a primary link of an access network), which does not require dedicating one of the parallel links to be tested for implementing a communication between different parts of the system, and which is particularly (but not exclusively) suitable for in-field interventions in access networks.

According to embodiments of the present invention, the above problem is solved by a system which comprises a first portable device and a second portable device. The first portable device comprises an input port and a number of output ports, wherein the input port is connectable to the further link and each output port is connectable to a respective one of the plurality of parallel links to be tested. The first portable device also comprises a number of switches, each switch being operable between a closed status, where it provides signal continuity between the respective output port and the input port, and an open status, where it isolates the respective output port from the input port. The first portable device and the second portable device are provided with respective radio transceivers suitable for establishing a bidirectional radio channel between them. The second portable device is capable of transmitting a command to the first portable device via the bidirectional radio channel, inducing the first portable device to bring one of its switches in its closed status.

In operation, the service person installs the first portable device between the parallel links to be tested and the further link. Specifically, the service person connects the input port of the first portable device to the further link and each output port of the first portable device to a respective parallel link to be tested. For example, in case the plurality of parallel links to be tested are the secondary links between a cabinet and a distribution box of an access network, the first portable device is installed in the cabinet by connecting the input port of the first portable device to the primary link of the end user who reported a problem with his connection and each output port to a respective parallel secondary link available at the cabinet.

The service person then goes to the opposite end of the plurality of parallel links to be tested (e.g. at the distribution box, in the above exemplary case of the secondary links of an access network), carrying the second portable device with him. The service person then operates the second portable device to establish the bidirectional radio channel with the first portable device. The service person then operates the second portable device to transmit a command to the first portable device via the established bidirectional radio channel, inducing it to bring one of its switches in the closed position, thereby providing signal continuity between the respective output port and the input port. This way, the closed switch also provides signal continuity between the link to be tested which is connected to that output port and the further link. The service person may then carry out the required tests on that link, for example by connecting a test device (e.g. a so-called "golden modem", such an ADSL and/or VDLS tester) thereto.

If the outcome of the tests is positive, the test session is ended. The service person may then connect the user link to the positively tested parallel link, so that connectivity of the end user is restored. Otherwise, if the outcome of the tests is negative, the service person operates the second portable device to transmit another command to the first portable device via the bidirectional radio channel, inducing it to bring in the closed status another one of its switches, thereby providing signal continuity between another link to be tested and the further link. The service person may then carry out the required tests on that link.

The above operation is repeated until a parallel link is found, which provides a positive outcome of the tests, or until all the parallel links connected to the output ports of the first portable device have been tested.

Advantageously, the system according to embodiments of the present invention does not require dedicating one of the parallel links to be tested for implementing a communication between different parts of the system. The first and second portable devices indeed embed all the components (namely, the radio transceivers) needed to establish a mutual communication autonomously, namely without relying on any physical resource of the communication network comprising the parallel links to be tested. Hence, the system of the invention is particularly suitable for use in contexts where few unused links are available for replacing the deteriorated or broken one.

Furthermore, the first and second devices are portable, and accordingly are suitable for being provided as part of the equipment to service people in charge of performing in-field interventions. Specifically, the first device—being portable—is advantageously suitable for being accommodated in the narrow space which is typically available at the cabinets of an access network.

According to a first aspect, the present invention provides a system for supporting in-field testing of a plurality of parallel links of a communication network, the plurality of parallel links being alternatively connectable to a further link of the communication network, the system comprising:

- a first portable device comprising an input port and a number of output ports, wherein the input port is manually connectable to the further link and each one of the output ports is manually connectable to a respective one of the plurality of parallel links to be tested, the first portable device further comprising a number of switches and a data processing unit, the data processing unit being capable of switching each one of the number of switches between a closed status, where it provides signal continuity between a respective one of the output ports and the input port, and an open status where it isolates the respective one of the output ports from the input port; and
- a second portable device capable of transmitting a command to the first portable device via a bidirectional radio channel, the command being capable of inducing the data processing unit to bring one of the number of switches in the closed status.

Preferably, the first portable device comprises an enclosure having a width of less than or equal to 400 mm, a length of less than or equal to 200 mm and a thickness of less than or equal to 50 mm.

Preferably, the second portable device comprises a portable mobile device.

According to an embodiment, the second portable device comprises a radio transceiver configured to transmit the command via the bidirectional radio channel, the radio transceiver being a device external to the portable mobile device and removably connectable to the portable mobile device.

Optionally, the second radio transceiver is removably connectable to the portable mobile device by means of a USB to serial adapter.

According to an embodiment, the bidirectional radio channel is a low power bidirectional radio channel.

Optionally, the low power bidirectional radio channel is operated in a frequency band at 433 MHz or 868 MHz.

Preferably, the first portable device is further configured to, upon execution of the command, transmit an acknowledgement to the second portable device via the bidirectional radio channel.

According to a second aspect, the present invention provides a method for performing an in-field testing of a plurality of parallel links of a communication network, the plurality of parallel links being alternatively connectable to a further link of the communication network, the method comprising:

a) installing a first portable device between the further link and the plurality of parallel links, said installing comprising connecting the further link to an input port of a first portable device and connecting each one of the plurality of parallel links to be tested to a respective output port of the first portable device;
b) at an opposite end of the plurality of parallel links, by means of a second portable device transmitting a command to the first portable device via a bidirectional radio channel, the command inducing a signal continuity between the input port and one output port of the first portable device, so that the parallel link of the plurality of parallel links which is connected to the said output port is connected to the further link; and
c) performing an in-field testing of the parallel link connected to the further link via the first portable device.

Preferably, the method further comprises, if the in-field testing of the parallel link provides a negative outcome:

d) by means of the second portable device, transmitting a further command to the first portable device via the bidirectional radio channel, the further command inducing a signal continuity between the input port and one further output port of the first portable device, so that a further parallel link of the plurality of parallel links which is connected to the said further output port is connected to the further link; and
e) performing an in-field testing of the further parallel link connected to the further link via the first portable device.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 2:
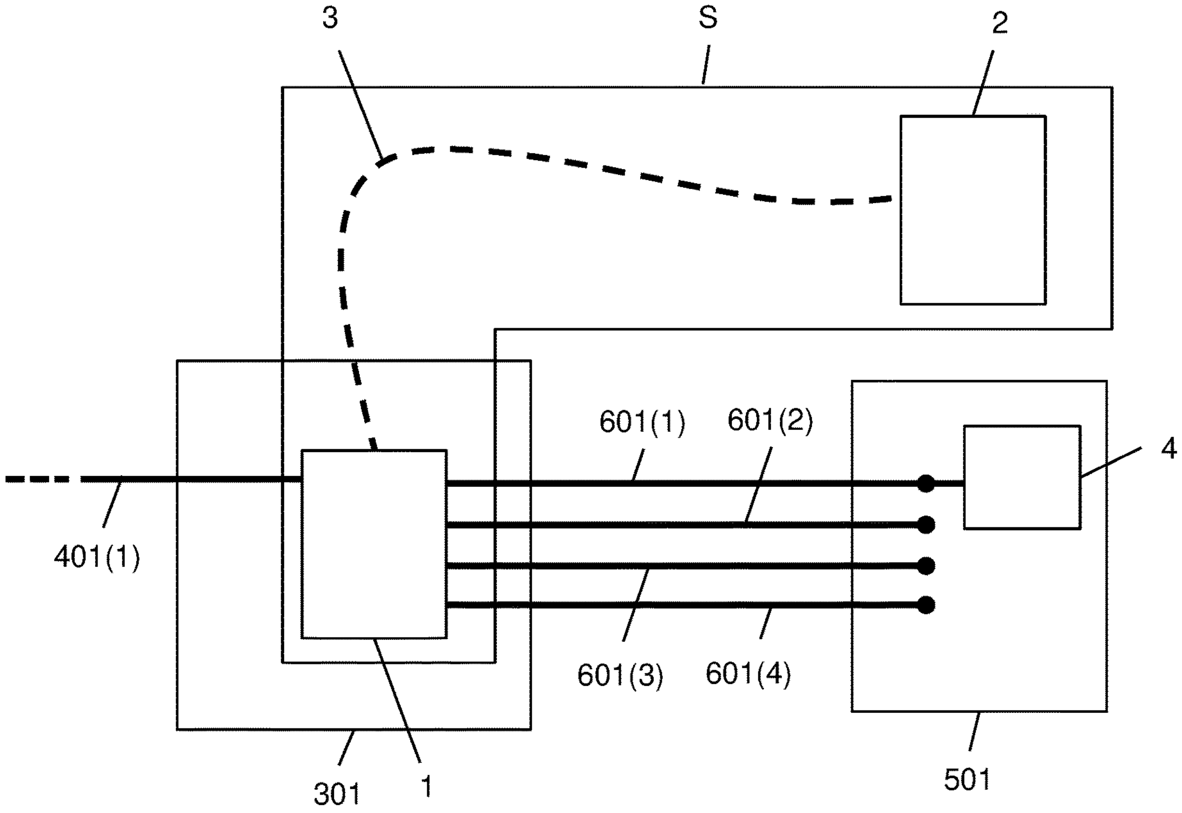
FIG. 2 shows the system according to embodiments of the present invention, applied to a plurality parallel secondary links alternatively connectable to a primary link of the exemplary access network of FIG. 1.

FIG. 2 schematically shows a system S for supporting in-field testing of a plurality of parallel links of a communication network (for example, but not exclusively, a plurality of parallel secondary links of an access network) alternatively connectable to a further link of the communication network (for example, but not exclusively, a primary link of an access network) according to embodiments of the present invention.

The system S comprises a first portable device 1 and a second portable device 2.

Figure 3A:
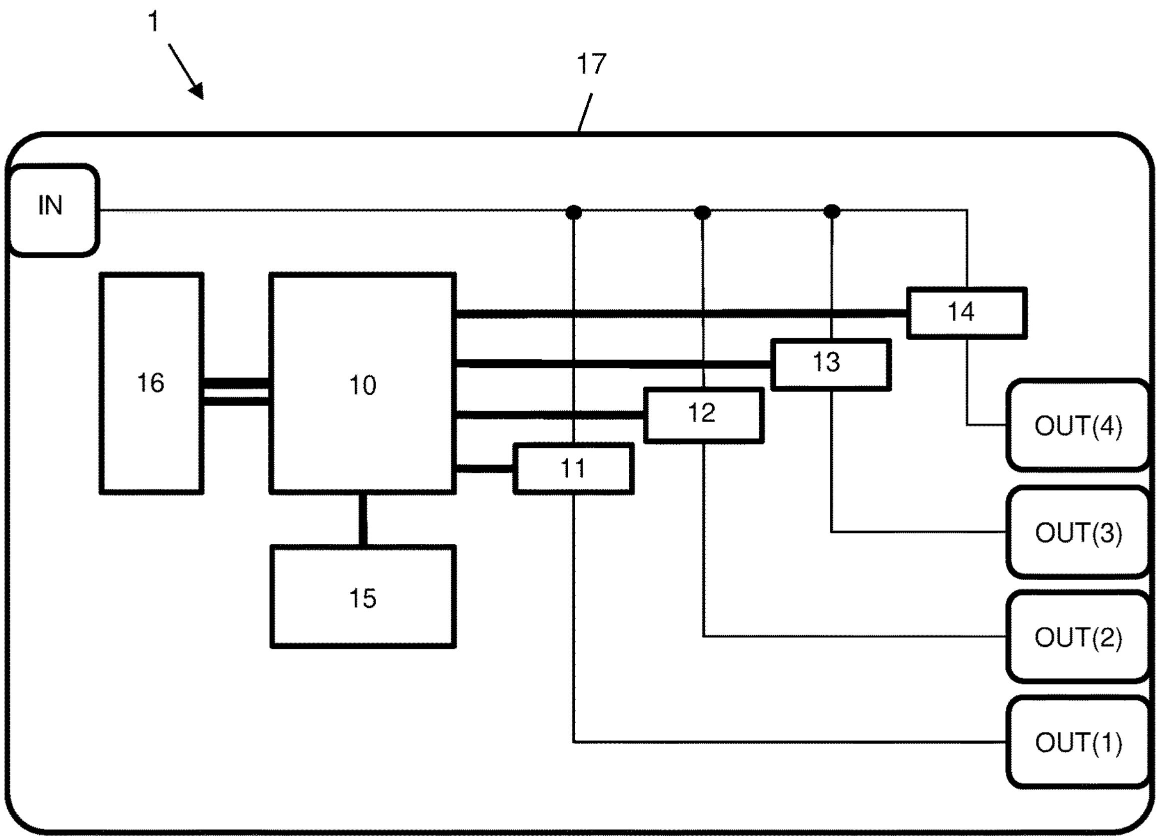
FIGS. 3*a* and 3*b* show in further detail the structure of the first portable device and second portable device of the system of FIG. 2, respectively.

With reference to FIG. 3*a*, the first portable device 1 preferably comprises an input port IN and a number of output ports, allowing to connect the first portable device 1 between the further link and the plurality of parallel links alternatively connectable thereto which are to be tested.

Specifically, the input port IN is connectable to the further link. For this purpose, the input port IN is preferably provided with an interface or connector for connection to the further link, such as a RJ-11 connector (in case the further link is a twisted pair).

Further, each output port is connectable to a respective parallel link to be tested. The number of output ports then limits the maximum number of links that may be tested in a same test session. By way of non-limiting example, the first portable device 1 shown in FIG. 3*a* comprises four output ports OUT(1), OUT(2), OUT(3), OUT(4). Each output port OUT(1), OUT(2), OUT(3), OUT(4) is preferably provided with a connector or interface for connection to a link to be tested, such as a RJ-45 interface (in case the parallel links to be tested are twisted pairs).

The first portable device 1 also preferably comprises a data processing unit 10 and a number of components controllable by the data processing unit 10.

The first portable device 1 in particular comprises a number of switches (specifically, one switch for each output port) 11, 12, 13, 14 controllable by the data processing unit 10. If the parallel links to be tested and the further link are twisted pairs, the switches 11, 12, 13, 14 may be electrical switches; if instead the parallel links to be tested and the further link are optical fibers, the switches 11, 12, 13, 14 may be optical switches.

Each switch 11, 12, 13, 14 is connected between the input port IN and a respective output port OUT(1), OUT(2), OUT(3), OUT(4). Each switch 11, 12, 13, 14 is operable by the data processing unit 10 between a closed status and an open status. In its closed status, each switch 11, 12, 13, 14 provides signal continuity (specifically, electrical continuity if the further link and the plurality of parallel links to be tested are twisted pairs) between the input port IN and the respective output port OUT(1), OUT(2), OUT(3), OUT(4). In the open status, instead, each switch 11, 12, 13, 14 isolates the input port IN from the respective output port OUT(1), OUT(2), OUT(3), OUT(4).

The first portable device 1 also preferably comprises a radio transceiver 15 suitable for establishing a bidirectional radio channel 3 with a corresponding radio transceiver comprised in the second portable device 2 (described herein below).

According to an embodiment, the bidirectional radio channel 3 is a low power bidirectional radio channel. In the present description and in the claims, the expression "bidirectional low power radio channel" will designate a bidirectional radio channel having a range of at least 1000 m, an output power lower than +30 dBm and a data rate not exceeding 200 kbit/s per channel. Exemplary low power radio techniques that may be used to implement the bidirectional low power radio channel 3 are LoRa ("Low Range") or DASH7.

According to a preferred embodiment, the bidirectional low power radio channel 3 is implemented based on the known LoRa ("Low Range") technique, by exploiting an unlicensed band for IoT ("Internet of Things") devices, such as 433 MHz, 868 MHz or 169 MHz. For example, the radio transceiver 15 may be a LoRa E32 module for transmission at 433 MHz or 868 MHz. Use of a low power bidirectional radio channel, or preferably of LoRa, is particular advantageous e.g. in rural areas or, in general, in areas with low mobile coverage or no mobile coverage at all.

Alternatively, the bidirectional radio channel 3 may be a mobile bidirectional radio channel, implemented e.g. by GSM, GPRS, UMTS (Universal Mobile Telephone System), HSDPA (High Speed Downlink Packet Access), LTE (Long Term Evolution) or 5G.

The first portable device 1 also preferably comprises a battery 16. The battery 16 is suitable for powering all the components of the first portable device 1. For this purpose, the battery 16 preferably provides 7 to 11 volts, for example 9 volts. The battery 16 may be a rechargeable battery.

All the components of the first portable device 1 are arranged within an enclosure 17. The enclosure 17 preferably has a portable size. More preferably, the enclosure 17 has a width less than or equal to 400 mm (for example, 230 mm), a length less than or equal to 200 mm (for example, 130 mm) and a thickness less than or equal to 50 mm (for example, 33 mm).

Figure 3B:
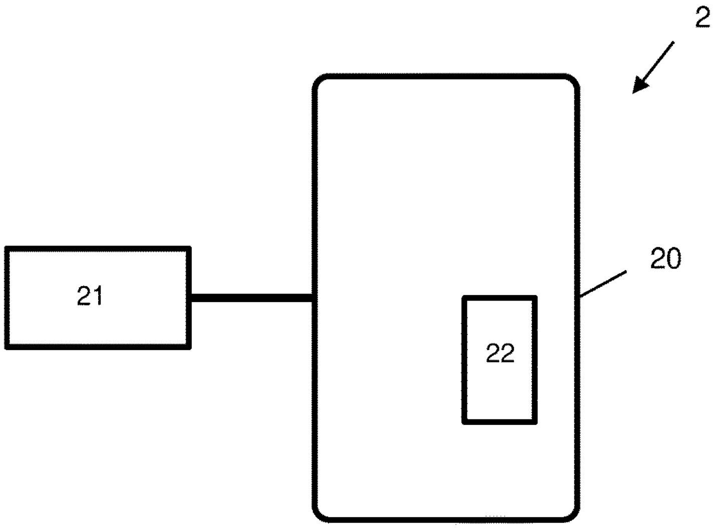

With reference now to FIG. 3*b*, the second portable device 2 preferably comprises a mobile device 20, such as a smartphone, provided with a data processing unit and an input/output user interface, for example a touchscreen (not depicted in FIG. 3*b*).

The second portable device 2 further preferably comprises a radio transceiver 21 suitable for establishing the above-mentioned bidirectional radio channel 3 with the radio transceiver 15 comprised in the first portable device 1 as described above. For example, in case the bidirectional radio channel 3 is a low power bidirectional radio channel, the radio transceiver 21 may be a LoRa E32 module for transmission at 433 MHz or 868 MHz. The radio transceiver 15 and radio transceiver 21 shall be configured with the same configuration parameters, including for example Address (uniquely indicating a certain transceiver) UartRate, Parity, AirRate, Power and WOR (Wake on Radio) timing.

In case the bidirectional radio channel 3 is a low power bidirectional radio channel, the radio transceiver 21 is preferably an external device connected to the mobile device 20. The connection may be implemented e.g. by a USB OTG (USB On-The-Go) cable connected to an USB port of the mobile device 20 and a USB to serial adapter, such as a CP2102 adapter.

Otherwise, the radio transceiver 21 may be embedded in the mobile device 20. This is the case, for example, if the bidirectional radio channel 3 is a mobile bidirectional radio channel.

The second portable device 2 is also preferably provided with a software application 22 configured to transmit commands to the first portable device 1 via the radio transceiver 21. Such software application may be for example the app Serial USB Terminal downloadable from Google Play.

Figure 1:
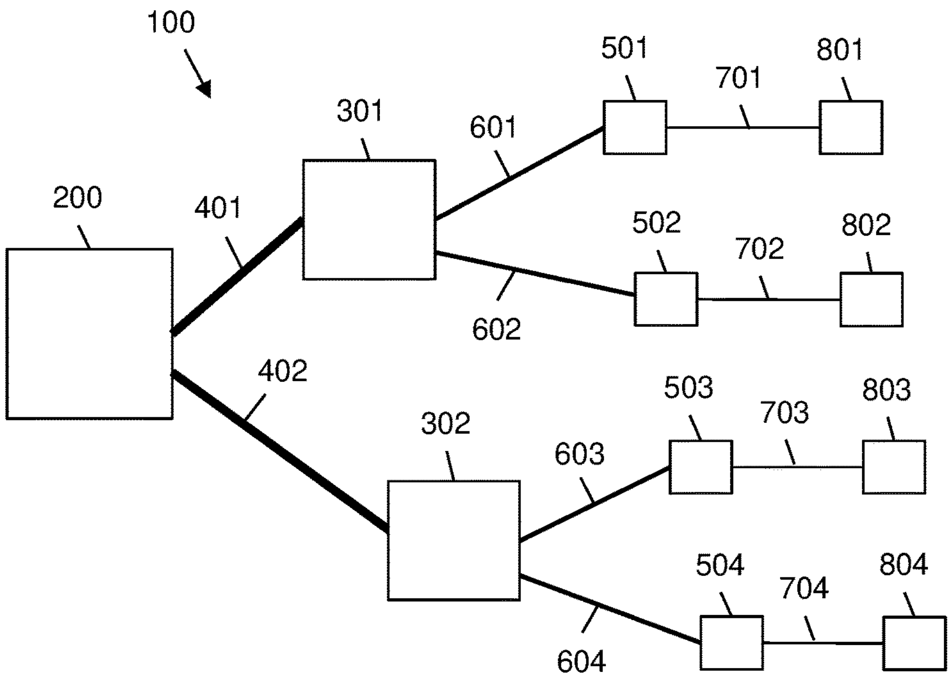
Fig. 1 (prior art)
FIG. 1 (already described above) shows a known exemplary access network in which the system for supporting in-field testing of a plurality of parallel links alternatively connectable to a further link according to embodiments of the present invention may be applied.
Figure 4:
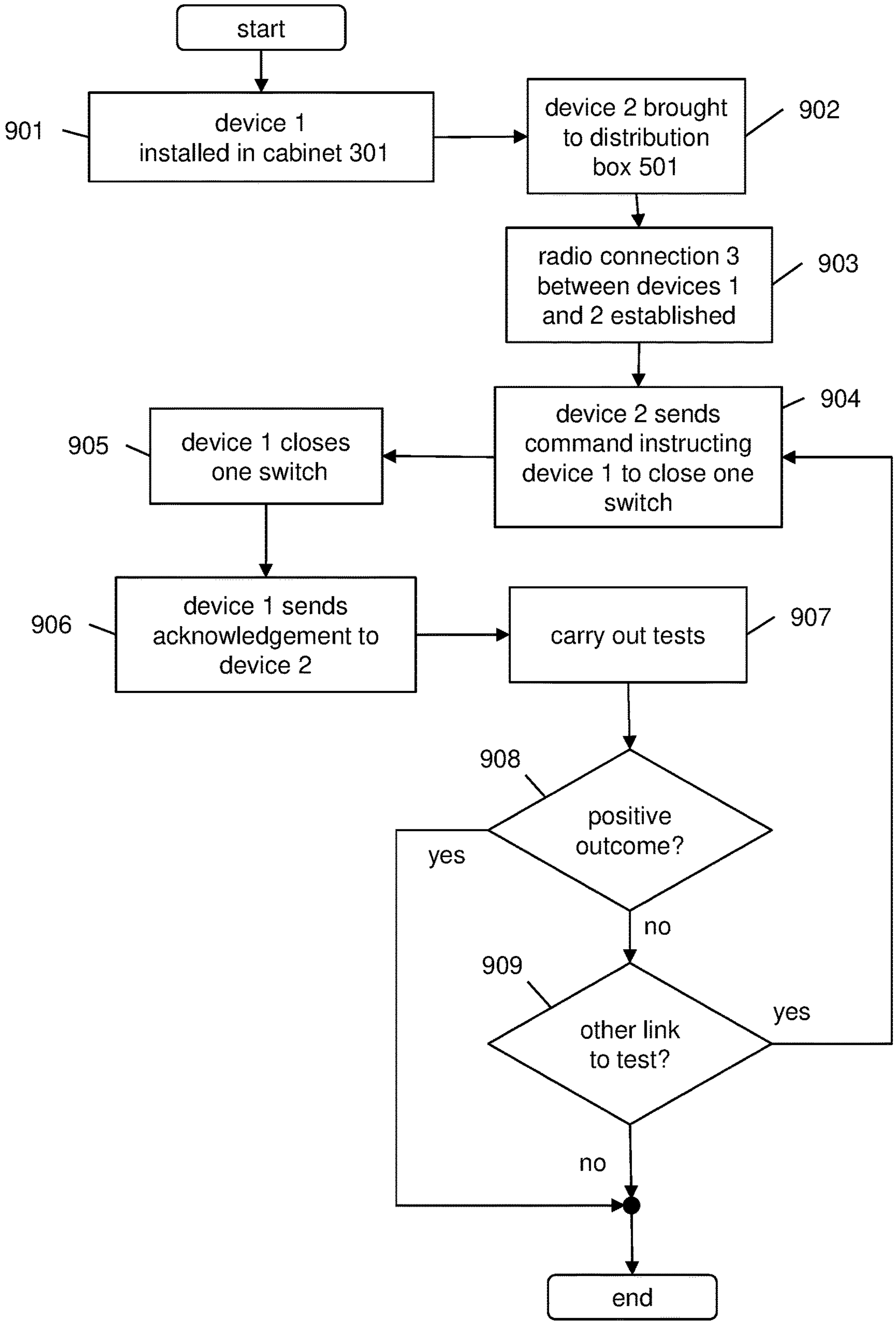
FIG. 4 is a flow chart of the operation of the system of FIG. 2, according to embodiments of the present invention.

Herein below, with reference to the flow chart of FIG. 4, the operation of the system S will be described in detail, assuming that an end user connected to the distribution box 501 of the access network 100 shown in FIG. 1 reports a problem with his connection (e.g. the connection is too slow or interrupted). A service person then makes an in-field intervention, for the purpose of checking whether the secondary link by which the end user is connected to the cabinet 301 is deteriorated or broken and, in the affirmative, replacing it with another secondary link parallel thereto which provides good performance.

Firstly, after the service person has tested the secondary link by which the end user is connected to the cabinet 301 and has confirmed that it is deteriorated or broken, the service person equipped with the first portable device 1 and second portable device 2 goes to the cabinet 301 and installs the first portable device 1 in the cabinet 301 (step 901).

Specifically, at step 901 the service person disconnects the currently used secondary link from the respective primary link, indicated with reference number 401(1) in FIG. 2 (for convenience, the other primary links of the plurality of primary links 401 between the local exchange 200 and the cabinet 301 are not depicted in FIG. 2). Then, the service person connects the primary link 401(1) to the input port IN of the device 1. The service person then connects each output port OUT(1), OUT(2), OUT(3), OUT(4) of the first portable device 1 to a respective secondary link 601(1), 601(2), 601(3), 601(4) to be tested. The secondary links 601(1), 601(2), 601(3), 601(4) to be tested are chosen amongst the plurality of parallel secondary links 601 between cabinet 301 and distribution box 501, except the presumably deteriorated or broken one, which the service person has just disconnected from the primary link 401(1).

The service person then goes to the distribution box 501, carrying the second portable device 2 with him (step 902). The second portable device 2 may be still disassembled at this stage, namely—if the radio transceiver 21 is an external device as depicted in FIG. 3*b*—it is still not connected to the mobile device 20.

Then, the service person operates the second portable device 2 to establish the bidirectional radio channel with the first portable device (step 903). For this purpose, for example, if the radio transceiver 21 is an external device as depicted in FIG. 3*b*, the service person may connect the radio transceiver 21 to the mobile device 20. As the radio transceiver 21 is connected to the mobile device 20, the bidirectional radio channel 3 with the radio transceiver 15 of the first portable device 1 is automatically established.

Then, the service person preferably operates the second portable device 2 to transmit a command to the first portable device 1 via the established bidirectional radio channel 3, instructing the first portable device 1 to close one of its switches 11, 12, 13, 14 (step 904).

According to an embodiment, each switch is assigned a respective label "X", where X is an integer number, and the command may be in the form of the integer number "X" identifying the desired switch. For example, the switches 11, 12, 13 and 14 may be assigned respective labels "1", "2", "3" and "4", and the command transmitted at step 904 may be "1", instructing the first portable device 1 to close the switch 11.

The command "1" is preferably input by the service person via a graphic user interface, which the software application 22 displays on the above-mentioned input/output user interface (for example, a touchscreen) of the mobile device 20. If the radio transceiver 21 is an external device as depicted in FIG. 3*b*, the software application 22 may be automatically started and display the graphic user interface as the radio transceiver 21 is connected to the mobile device 20. Otherwise, the service person may manually start the software application 22. The command is then transmitted by the radio transceiver 21 to the radio transceiver 15 of the first portable device 1.

As the first portable device 1 receives the command "1", it preferably executes it, thereby bringing the switch 11 indicated by the received command "1" in the closed position, thereby providing electrical continuity between the output port OUT(1) and the input port IN (step 905). This way, the closed switch 11 also provides electrical continuity between the secondary link 601(1) to be tested and the primary link 401(1). All the other switches 12, 13, 14 of the first portable device 1 are instead kept in their open status.

Upon completion of the execution of the command "1", the first portable device 1 preferably transmits to the second portable device 2 an acknowledgement via the bidirectional radio channel 3, informing the service person that the command has been successfully executed (step 906). The acknowledgement may have the same content as the command, namely "1".

The service person may then carry out the required tests on the secondary link 601(1) (step 907), for example by connecting a test device 4 (e.g. a so-called "golden modem", such an ADSL and/or VDLS tester) thereto, as depicted in FIG. 2.

If the outcome of the tests is positive (step 908), the test session is ended. The service person may then connect the user link to the positively tested secondary link 601(1), so that connectivity of the end user is restored.

Otherwise, if the outcome of the tests is negative, the service person preferably reverts to step 904, namely it operates the second portable device 2 to transmit a further command to the first portable device 1 via the bidirectional radio channel 3, instructing the first portable device 1 to close another one of its switches 11, 12, 13, 14. For example, at this second iteration of step 904, the command transmitted may be "2", instructing the first portable device 1 to close the switch 12.

The first portable device 1 then repeats step 905, namely it brings the switch 12 indicated by the further received command "2" in the closed position, thereby providing electrical continuity between the output port OUT(2) and the input port IN. This way, the closed switch 12 also provides electrical continuity between the secondary link 601(2) to be tested and the primary link 401(1). All the other switches 11, 13, 14 of the first portable device 1 are instead kept in their open status.

The first portable device 1 then preferably repeats step 906, namely it transmits to the second portable device 2 an acknowledgement via the bidirectional radio channel 3, informing the service person that the further command "2" has been successfully executed. The acknowledgement may have the same content as the further command, namely "2".

Step 907 of carrying out the required tests is then repeated on the secondary link 601(2).

If the outcome of the tests is positive (step 908), the test session is ended and the service person may then connect the user link to the positively tested secondary link 601(2), so that connectivity of the end user is restored.

If the outcome of the tests is negative, the service person reverts instead to step 904, namely it operates the second portable device 2 to transmit a still further command "3" to the first portable device 1, instructing the first portable device 1 to close the switch 13. Steps 905, 906 and 907 are then repeated. The required tests are then repeated on the secondary link 601(3). If the outcome of the tests is positive (step 908), the test session is ended and the service person may then connect the user link to the positively tested secondary link 601(3).

Steps 904-907 are repeated until either a secondary link is found, which provides a positive outcome of the tests, or until all the parallel secondary links connected to the output ports of the first portable device 1 have been tested (step 909).

In the latter case, the service person shall go to the cabinet 301, disconnect the already tested parallel secondary links from the output ports OUT(1), OUT(2), OUT(3), OUT(4) of the first portable device 1 and, if more parallel secondary links are available at the cabinet 301, connect them to the output ports OUT(1), OUT(2), OUT(3), OUT(4). Steps 902-909 described above are then repeated, until a secondary link is found which provides a positive outcome of the tests. Otherwise, if no more parallel secondary links are available at the cabinet 301, the in-field intervention on the cabinet 301 is closed and different measures will be taken to try to solve the connectivity issue. Advantageously, the system S according to embodiments of the present invention does not require dedicating one of the parallel links to be tested for implementing a communication between different parts of the system. The first and second portable devices 1, 2 indeed embed all the components (namely, the radio transceivers 15, 21) needed to establish a mutual communication autonomously, namely without relying on any physical resource of the communication network 100 comprising the parallel links to be tested. Hence, the system S is particularly suitable for use in contexts where few unused links are available for replacing the deteriorated or broken one.

Furthermore, the first and second devices 1, 2 are portable, and accordingly are suitable for being provided as part of the equipment to service people in charge of performing in-field interventions. Specifically, the first device 1—being portable—is advantageously suitable for being accommodated in the narrow space which is typically available at the cabinets of an access network.

Furthermore, if the first portable device 1 fails to execute a command received from the second portable device 2, no acknowledgement is received by the second portable device 2 from the first portable device 1. The service person may then advantageously refrain from starting any test until the acknowledgement is received. This way, if the service person notices that the test results are negative, he can reasonably conclude that the negative results are due to a bad performance of the parallel link under test, and not the first portable device failing to connect to the selected link.

Though the above detailed description has been made with reference to a scenario where a plurality of parallel secondary links of an access network are tested, this is not limiting. The system S may be indeed applied to any scenario where multiple parallel links of a communication network shall be tested, including for example the primary links connecting a local exchange and a cabinet in an access network. In this case, the first portable device 1 will be installed at the local exchange, and the service person will then go to the cabinet carrying the second portable device 2 with him, from where he will execute the test session, in a way similar to that disclosed above in connection with the flow chart of FIG. 4.

The invention claimed is:

1. A system for supporting in-field testing of a plurality of parallel links of a communication network, said plurality of parallel links being alternatively connectable to a further link of said communication network, said system comprising:

a first portable device comprising an input port and a number of output ports, wherein said input port is manually connectable to said further link and each one of said output ports is manually connectable to a respective one of said plurality of parallel links to be tested, said first portable device further comprising a number of switches and a data processing unit, said data processing unit being capable of switching each one of said number of switches between a closed status, where it provides signal continuity between a respective one of said output ports and said input port, and an open status where it isolates said respective one of said output ports from said input port; and a second portable device capable of transmitting a command to said first portable device via a bidirectional radio channel, said command being capable of inducing said data processing unit to bring one of said number of switches in said closed status.

2. The system according to claim 1, wherein said first portable device comprises an enclosure having a width of less than or equal to 400 mm, a length of less than or equal to 200 mm and a thickness of less than or equal to 50 mm.

3. The system according to claim 1, wherein said second portable device comprises a portable mobile device.

4. The system according to claim 3, wherein said second portable device comprises a radio transceiver configured to transmit said command via said bidirectional radio channel, said radio transceiver being a device external to said portable mobile device and removably connectable to said portable mobile device.

5. The system according to claim 1, wherein said bidirectional radio channel is a low power bidirectional radio channel.

6. The system according to claim 5, wherein said low power bidirectional radio channel is operated in a frequency band at 433 MHz or 868 MHz.

7. The system according to claim 1, wherein said first portable device is further configured to, upon execution of said command, transmit an acknowledgement to said second portable device via said bidirectional radio channel.

8. The system according to claim 7, wherein said acknowledgement is the acknowledgement of the closing of one of said number of switches.

9. A method for performing an in-field testing of a plurality of parallel links of a communication network, said plurality of parallel links being alternatively connectable to a further link of said communication network, said method comprising:

a) installing a first portable device between said further link and said plurality of parallel links, said installing comprising connecting said further link to an input port of a first portable device and connecting each one of said plurality of parallel links to be tested to a respective output port of said first portable device;

b) at an opposite end of said plurality of parallel links, by means of a second portable device transmitting a command via a bidirectional radio channel to said first portable device, said command inducing a signal continuity between said input port and one output port of said first portable device, so that the parallel link of said plurality of parallel links which is connected to said one output port is connected to said further link; and c) performing an in-field testing of said parallel link connected to said further link via said first portable device.

10. The method according to claim 9, wherein it further comprises, if said in-field testing of said parallel link provides a negative outcome:

d) by means of said second portable device, transmitting a further command via said bidirectional radio channel to said first portable device, said further command inducing a signal continuity between said input port and one further output port of said first portable device, so that a further parallel link of said plurality of parallel links which is connected to said one further output port is connected to said further link; and e) performing an in-field testing of said further parallel link connected to said further link via said first portable device.

* * * * *